United States Patent
Evan

(10) Patent No.: US 9,560,187 B2
(45) Date of Patent: Jan. 31, 2017

(54) SYSTEM FOR PREVENTION OF TEXTING WHILE DRIVING

(71) Applicant: Gabriel Evan, Marshall, AK (US)

(72) Inventor: Gabriel Evan, Marshall, AK (US)

(*) Notice: Subject to any disclaimer, the term of this patent is extended or adjusted under 35 U.S.C. 154(b) by 0 days.

(21) Appl. No.: 14/682,074

(22) Filed: Apr. 8, 2015

(65) Prior Publication Data

US 2015/0296075 A1 Oct. 15, 2015

Related U.S. Application Data

(60) Provisional application No. 61/977,116, filed on Apr. 9, 2014.

(51) Int. Cl.
*H04W 4/14* (2009.01)
*H04M 1/725* (2006.01)

(52) U.S. Cl.
CPC .......... *H04M 1/72577* (2013.01); *H04W 4/14* (2013.01); *H04M 1/72552* (2013.01)

(58) Field of Classification Search
CPC ..... G06Q 30/0215; G06Q 20/10; H04W 4/14; H04M 1/72577
USPC ..... 455/416, 41.2, 41.1, 456.1, 466; 340/3.1
See application file for complete search history.

(56) References Cited

U.S. PATENT DOCUMENTS

| | | | |
|---|---|---|---|
| 8,204,649 B2 | 6/2012 | Zhou | |
| 2005/0255874 A1 | 11/2005 | Stewart-Baxter | |
| 2011/0275321 A1 | 11/2011 | Zhou | |
| 2012/0268235 A1* | 10/2012 | Farhan | G05B 23/0278 340/3.1 |
| 2014/0073300 A1* | 3/2014 | Leeder | H04B 5/0031 455/416 |

* cited by examiner

*Primary Examiner* — Phuoc H Doan
(74) *Attorney, Agent, or Firm* — The Gray Law Group, LTD; Robert W. Gray

(57) ABSTRACT

A system for prevention of texting while driving is comprised of an always-on mobile application which is installed in the user's smartphone or other mobile electronic device, and a proximity sensor and transmitter which is preferably mounted on the steering column of the user's vehicle. The sensor detects any electronic device with the mobile application installed within a specific short distance, consistent with the user being seated in the driver's seat with the electronic device activated. The sensor transmits a periodic SMS text message which is received by the electronic device. The electronic device receives the text message, and the mobile application covers the visual display with a prohibitive message. Optionally, the mobile application may also disable the keys of the electronic device.

4 Claims, 1 Drawing Sheet

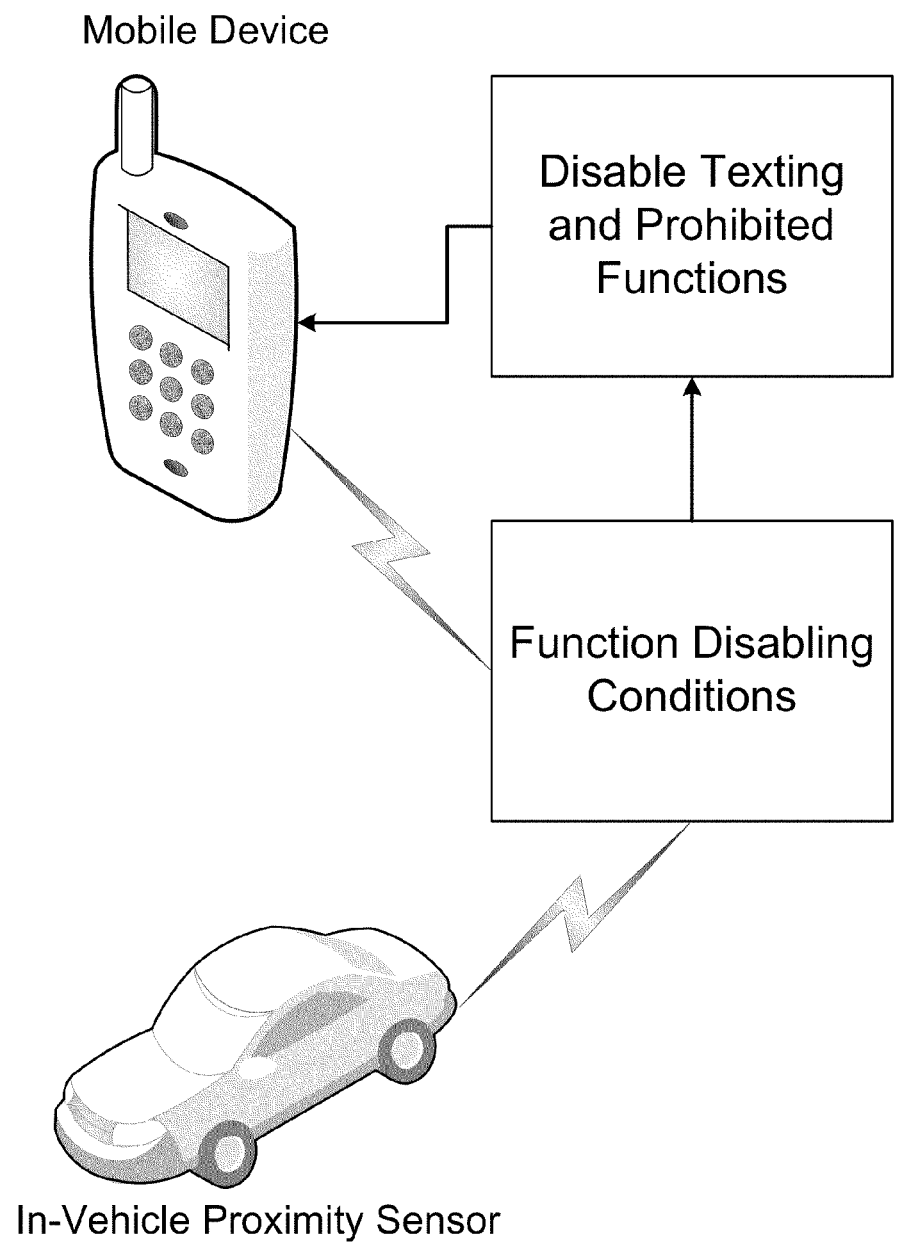

SYSTEM FOR PREVENTION OF TEXTING WHILE DRIVING

CROSS-REFERENCE TO RELATED APPLICATIONS

This application claims the benefit of U.S. Provisional Application No. 61/977,116, filed Apr. 9, 2014.

STATEMENT REGARDING FEDERALLY SPONSORED RESEARCH OR DEVELOPMENT

Not Applicable

PARTIES TO A JOINT RESEARCH AGREEMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The invention relates generally to accessories for electronic devices and in particular to a system for prevention of texting while driving. Worldwide, thousands of drivers and passengers lose their lives every year due to the unfortunate practice of texting while driving. Tens of thousands more are injured every year, with millions of dollars in property damage. Sadly, young drivers are exceptionally vulnerable due to a confluence of factors: their highly elevated reliance on text messaging compared to the rest of the population, coupled with their inexperience behind the wheel. The practice has been banned in most states for good reason, but the changes in the law haven't made much impact on the death toll. An electronic system which effectively prevents drivers from texting while seated in the driver's seat would be well received. Parents may insist on installation of the system before their teenagers are allowed to drive the family car. Large corporations may require installation in every vehicle in their fleet. Traffic court judges may reasonably require proof of installation of the system in defendants' vehicles and personal electronic devices as a condition of sentencing for a broad range of traffic offenses, not limited to texting while driving. Ultimately, state and federal legislatures, traffic safety agencies, and communications regulatory agencies may require that any vehicle or personal electronic device built or sold within their jurisdictions must have components of the system installed. A system for prevention of texting while driving, which blocks the visual display of a smartphone or similar mobile electronic device, would resolve this problem.

SUMMARY OF THE INVENTION

Accordingly, the invention is directed to a system for prevention of texting while driving. The system is comprised of an always-on mobile application which is installed in the user's smartphone or other mobile electronic device, and a proximity sensor and transmitter which is preferably mounted on the steering column of the user's vehicle. The sensor detects any electronic device with the mobile application installed within a specific short distance, consistent with the user being seated in the driver's seat with the electronic device activated. The sensor transmits a periodic SMS text message which is received by the electronic device. The electronic device receives the text message, and the mobile application covers the visual display with a prohibitive message. Optionally, the mobile application may also disable the keys of the electronic device.

Additional features and advantages of the invention will be set forth in the description which follows, and will be apparent from the description, or may be learned by practice of the invention. The foregoing general description and the following detailed description are exemplary and explanatory and are intended to provide further explanation of the invention.

BRIEF DESCRIPTION OF THE DRAWING

The accompanying drawing is included to provide a further understanding of the invention and is incorporated into and constitute a part of the specification. It illustrates one embodiment of the invention and, together with the description, serves to explain the principles of the invention.

FIG. 1 is a flowchart displaying the electronic system components, features, communications, and their interconnections, and other relevant processes and events during the course of using the invention.

DETAILED DESCRIPTION OF THE INVENTION

Referring now to the invention in more detail, the invention is directed to a system for prevention of texting while driving. The system is comprised of an always-on mobile application which is installed in the user's smartphone or other mobile electronic device, and a proximity sensor with transmitter, preferably mounted on the steering column of the user's vehicle. The sensor detects any electronic device with the mobile application installed within a specific short distance, consistent with the user being seated in the driver's seat with the electronic device activated. The sensor transmits a periodic SMS text message which is received by the electronic device. The electronic device receives the text message, and the mobile application covers the device's visual display with a prohibitive message. Optionally, the mobile application may also disable the keys of the electronic device.

It is to be understood that while the system is intended for installation as an after-market modification by users or by repair and customizing shops, this is not intended as a limitation. Certain components of the invention may be installed as original equipment by vehicle manufacturers, and by manufacturers of smartphones and other mobile electronic devices.

The first exemplary embodiment provides a small and unobtrusive proximity sensor which must be installed in the user's vehicle, in a location which is close to the upper body of a person seated in the driver's seat. Preferably, the sensor is mounted on the steering column. Alternate locations may include the interior surface of the driver's door, a location on the dashboard between the steering wheel and the door, and the ceiling of the passenger compartment near the driver's head. The location must be selected such that the driver is within range, but no other person in the vehicle who may be safely texting will be affected.

In addition, the system equips the sensor with a means for detecting whether the vehicle is currently in operation, such as engine noise, engine vibration, rotation of the fan blade, or connection with the vehicle's electronic system and its engine related signals. The sensor is preferably powered by a small, replaceable battery or by connection with the vehicle's electronic system. If it is powered by a battery, the sensor detects battery strength and, when battery strength is 10% or lower, the sensor transmits an SMS text message to the user's device, stating that the battery must be replaced.

The system also provides an always-on mobile application, which must be installed on the user's smartphone or similar mobile electronic device. Each copy of the application includes a serial number which is unique to that copy, and will be unique to the device wherein it is installed. Whenever the device is activated, the application transmits a brief SMS text message containing the serial number with a weak signal at short, fixed intervals, such as once every 30 seconds. The application excludes these text messages from the display on the device, and the signal is too weak to be acquired and retransmitted by a cellular transmitter tower. Thus the text messages are not retransmitted elsewhere, nor are they counted against any possible limitation on the user's service plan.

The sensor receives the text message from the user's device, and measures the signal strength as a means of determining distance. If the signal strength indicates that the device is within a predetermined distance, such as 18 inches, indicating that the user is sitting in the driver's seat, the sensor begins transmitting a responsive SMS text message at similar short, predetermined intervals. The application excludes the responsive text from the display on the device. The responsive text includes the serial number contained in the application's original message, as a means of limiting and directing the response to the user's device and none other.

When the application receives a responsive text which contains the serial number corresponding to the user's device, the visual display of the device is blocked by a prohibitive message, such as "Stop texting." Optionally, the application may also disable the keys of the device. The sensor continues to transmit the responsive text at intervals until conditions indicate that the device has been deactivated, the user is no longer in the driver's seat, or the vehicle is no longer in operation. When the user's application has stopped receiving the responsive text for a significant multiple of the predetermined interval, such as 30 seconds, the device is unblocked.

To use the first exemplary embodiment, the user activates the sensor and mounts it in the vehicle in an appropriate location. The user then installs the mobile application in the mobile electronic device. The subsequent operation of the system is automatic.

The components of the system are preferably manufactured from durable, rigid materials such as steel, aluminum alloy, brass, and high-impact plastic. Those components of the system which rely on the transmission and/or reception of signals are preferably manufactured from metals such as steel, aluminum alloy, and brass. Components, component sizes, and materials listed above are preferable, but artisans will recognize that alternate components and materials could be selected without altering the scope of the invention.

While the foregoing written description of the invention enables one of ordinary skill to make and use what is presently considered to be the best mode thereof, those of ordinary skill in the art will understand and appreciate the existence of variations, combinations, and equivalents of the specific embodiment, method, and examples herein. The invention should, therefore, not be limited by the above described embodiment, method, and examples, but by all embodiments and methods within the scope and spirit of the invention.

I claim:

1. A system for prevention of texting while driving, comprising:
    a mobile electronic device;
    an application installed on said mobile electronic device;
    said application always being active on said mobile electronic device;
    a proximity sensor with a transmitter;
wherein said proximity sensor is installed within a vehicle, detects said mobile electronic device at a predetermined distance, detects whether the vehicle is in operation, and sends SMS text messages to said application which deactivates said mobile electronic device when said vehicle is in operation;
wherein said proximity sensor repeats sending a SMS text message to said application at a predetermined interval;
and wherein said application reactivates said mobile electronic device if no SMS text message is received within a second longer predetermined interval.

2. The system for prevention of texting while driving of claim 1, wherein said proximity sensor is mounted on a steering column of a vehicle and said predetermined distance is consistent with a user being seated in a driver seat of said vehicle.

3. The system for prevention of texting while driving of claim 2, wherein said application covers a screen on said mobile electronic device with a prohibitive message when the phone is deactivated.

4. The system for prevention of texting while driving of claim 1, wherein said application covers a screen on said mobile electronic device with a prohibitive message when the phone is deactivated.

* * * * *